United States Patent
Aaron et al.

(10) Patent No.: US 9,414,243 B2
(45) Date of Patent: *Aug. 9, 2016

(54) METHOD AND APPARATUS FOR RELATING TO QUALITY OF SERVICE IN WIRELESS NETWORKS

(71) Applicant: AT&T Intellectual Property I, L.P., Atlanta, GA (US)

(72) Inventors: Jeffrey Aaron, Atlanta, GA (US); Cheng P. Liu, Johns Creek, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/869,353

(22) Filed: Sep. 29, 2015

(65) Prior Publication Data
US 2016/0021553 A1    Jan. 21, 2016

Related U.S. Application Data

(63) Continuation of application No. 13/600,396, filed on Aug. 31, 2012, now Pat. No. 9,148,490, which is a continuation of application No. 12/876,548, filed on Sep. 7, 2010, now Pat. No. 8,270,315, which is a continuation of application No. 11/957,905, filed on Dec. 17, 2007, now Pat. No. 7,792,051.

(51) Int. Cl.
*H04W 24/02* (2009.01)
*H04L 29/08* (2006.01)
(Continued)

(52) U.S. Cl.
CPC .............. *H04W 24/02* (2013.01); *H04L 67/32* (2013.01); *H04W 64/006* (2013.01); *H04L 69/32* (2013.01); *H04W 24/10* (2013.01)

(58) Field of Classification Search
CPC ... H04W 24/02; H04W 24/10; H04W 64/006; H04W 28/0231; H04W 28/0242; H04W 28/0247; H04W 28/0268; H04L 67/32; H04L 67/322; H04L 69/32
See application file for complete search history.

(56) References Cited

U.S. PATENT DOCUMENTS

| | | | |
|---|---|---|---|
| 7,904,079 B1 | 3/2011 | Lundy et al. | |
| 2003/0103470 A1* | 6/2003 | Yafuso | H04L 1/0001 370/282 |

(Continued)

OTHER PUBLICATIONS

Notice of Allowance mailed May 12, 2010 in U.S. Appl. No. 11/957,905.

(Continued)

*Primary Examiner* — Paul H Masur
(74) *Attorney, Agent, or Firm* — Hartman & Citrin LLC

(57) ABSTRACT

A method for adapting quality of service to dynamics of a wireless telecommunications network is provided. The method includes collecting data relating to operation of an element in the network, wherein the collected data comprises radio-frequency (RF) data relating to operation of the network. The method also includes pre-calculating, from the collected data, a dynamic operational characteristic of the network, wherein the pre-calculating includes pre-calculating from the collected data to obtain a geometrical determination based on a geographical location of a wireless communications device within the network. The method further includes making available the pre-calculated characteristic of the network to an application of the device using the network, including storing the characteristic at a pre-calculation server accessible by the device so the device can selectively retrieve the characteristic, and updating the characteristic at a frequency based on a trigger related to volatility of the RF data being collected.

20 Claims, 4 Drawing Sheets

(51) Int. Cl.
*H04W 64/00* (2009.01)
*H04W 24/10* (2009.01)

(56) References Cited

U.S. PATENT DOCUMENTS

| | | | | |
|---|---|---|---|---|
| 2004/0085922 | A1* | 5/2004 | Herle | H04W 28/24 370/328 |
| 2004/0215769 | A1 | 10/2004 | Yoshida et al. | |
| 2005/0148359 | A1 | 7/2005 | Joeressen | |
| 2005/0243862 | A1 | 11/2005 | Krishnan | |
| 2006/0217116 | A1 | 9/2006 | Cassett et al. | |
| 2006/0234698 | A1 | 10/2006 | Fok et al. | |
| 2007/0298811 | A1 | 12/2007 | Hartman et al. | |
| 2008/0049755 | A1 | 2/2008 | Gannon et al. | |
| 2008/0057894 | A1* | 3/2008 | Aleksic | H02J 9/002 455/187.1 |
| 2008/0108348 | A1 | 5/2008 | Kottilingal et al. | |
| 2008/0146161 | A1* | 6/2008 | Bugenhagen | H04W 16/18 455/67.11 |
| 2009/0069018 | A1 | 3/2009 | Babbar | |
| 2009/0088170 | A1* | 4/2009 | Aaron | H04W 72/085 455/445 |

OTHER PUBLICATIONS

Office Action mailed Oct. 26, 2009 in U.S. Appl. No. 11/957,905.
Notice of Allowance mailed Jun. 15, 2012 in U.S. Appl. No. 12/876,548.
Office Action mailed Feb. 29, 2012 in U.S. Appl. No. 12/876,548.
Notice of Allowance mailed May 29, 2015 in U.S. Appl. No. 13/600,396.
Office Action mailed Feb. 13, 2015 in U.S. Appl. No. 13/600,396.
Office Action mailed Jul. 25, 2014 in U.S. Appl. No. 13/600,396.

* cited by examiner

METHOD AND APPARATUS FOR RELATING TO QUALITY OF SERVICE IN WIRELESS NETWORKS

CROSS REFERENCE TO RELATED APPLICATIONS

This application is a continuation of U.S. application Ser. No. 13/600,396, filed Aug. 31, 2012, now U.S. Pat. No. 9,148,490, which is a continuation of U.S. application Ser. No. 12/876,548, filed Sep. 7, 2010, now U.S. Pat. No. 8,270,315, which is a continuation of U.S. application Ser. No. 11/957,905, filed Dec. 17, 2007, now U.S. Pat. No. 7,792,051, the entireties of which are herein incorporated by reference.

BACKGROUND

This invention relates in general to quality of service in telecommunications networks, and relates in particular to improving the quality of service in wireless networks.

Users of telecommunications networks expect to receive dependable and reliable levels of service of various kinds of communications on those networks. The term "quality of service" (QoS) is sometimes used as a measure of quality provided by a particular telecommunications network, and those skilled in the art will recognize that quality of service may refer to mechanisms for reserving or allocating hardware or software/logical resources for traffic flowing on a telecommunications network. The nature of those resources may depend on user variables, such as the nature of the traffic (for example, video teleconference) and the extent to which the particular kind of traffic may require at least a minimum level of quality when traveling across the network. Quality of service guarantees may be important in applications such as real-time streaming multimedia presentations, interactive applications, or voice over IP (VOIP), as those applications often require a fixed by rate and are delay sensitive.

For wireline telecommunications networks, quality of service can be successfully provided by building network capacity that exceeds predictable or maximum-expected traffic loads or by building a lesser network capacity and utilizing certain QoS mechanisms such as explicit resource reservation (e.g., IntServ, Integrated Services) or traffic marking with priority traffic treatment (e.g., DiffServ, Differentiated Services). The performance of such wireline networks is predictable relatively independently of events happening outside the network, unless such events result in physical damage to the network itself. The assumption is that the telecommunications network supports the applications using the wireline network, and that the network must be designed and operated to provide certain levels of quality of service required for the particular applications using the network.

Wireless networks, which rely on radio-frequency (RF) communications between one or more wireless devices and/or fixed radio sites, cannot provide a certain and predictable quality of service like wireline networks. Wireless connections are subject to external interference from unrelated transmissions, co-interference (e.g., from other mobile terminals, or other cells), multi-path changes in signal propagation, signal path changes due to movement of the wireless terminal, and other variable factors. These factors and changes are largely uncontrollable, usually additive, usually severe, and usually rapid. Traditional quality of service methods cannot hope to deal reliably with the changes inherent with wireless networks, or at least not at any economically-feasible level.

The difficulties in adapting QoS-sensitive applications to wireless network dynamics depends on the RF interface, where "RF interface" refers to the portion of the overall network that is truly wireless as well as the associated equipment and software, the "interface" terminology referring to the transition from the service provider's wireline network portion to the radio or wireless network portion. A given quality of service usually requires a particular bandwidth, as well as possibly a minimum delay and/or minimum jitter, but bandwidth on any given wireless connection cannot be guaranteed because maximum available bandwidth is related to the received power of the RF signal. Received RF power varies greatly, and often rapidly, and often uncontrollably, because of the above-mentioned factors including changes in RF path, RF channel, and motion- or time-dependent multi-path variations in signal travel. These large-magnitude and rapid changes in wireless networks, at the worst, cause the network to drop communication that the RF interface cannot support. That result is, of course, unsatisfactory to users of the wireless network and limits the successful adaptation of new applications that require a dependable quality of service for operating on a wireless network, especially where these new application and services are particularly sensitive to bandwidth, delay/latency, and/or jitter.

One approach to overcoming the foregoing problem is to modify the RF interface to be more stable. Such modification, in traditional practice, amounts to adding more cell sites to the RF network so as to increase the breadth and the depth of coverage for the RF network. That approach is extremely expensive and, furthermore, may present practical as well as political problems in obtaining approval to add cell towers in some areas. Moreover, even adding cell sites to a near-saturation level may not succeed in overcoming the problems inherent with RF signal propagation.

Another possible solution to the problem is doing something in the wireless network to partially compensate for the uncontrollable variations of the RF interface. However, the wireless network cannot generally accomplish this because the variations inherent in the RF interface are mostly uncontrollable, such that the variable aspects of the wireless network cannot be commanded or controlled to adapt or control other elements in the data network.

SUMMARY

Stated in general terms, embodiments of the present method and apparatus enable an application to adapt to or compensate for changes in operation of a wireless network, instead of attempting to command the wireless network to adapt to the application. Embodiments accomplish such adaptation by collecting pertinent RF data concerning operation of the wireless network, and pre-calculating at least one anticipated operational characteristic of the wireless network based on one or more operational network dynamics determined from the pre-calculation. The pre-calculated operational characteristic of the wireless network is provided to the application, so that the operation of the application can adapt to the anticipated dynamic variation in operation of the wireless network.

In one embodiment of the disclosure, a method for adapting quality of service to dynamics of a wireless telecommunications network is provided. The method includes collecting data relating to operation of an element in the network, wherein the collected data comprises radio-frequency (RF) data relating to operation of the network. The method also includes pre-calculating, from the collected data, a dynamic operational characteristic of the network, wherein the pre-calculating includes pre-calculating from the collected data to obtain a geometrical determination based on a geographical location of a wireless communications device within the network. The method further includes making available the pre-calculated characteristic of the network to an application of the device using the network, including storing the characteristic at a pre-calculation server accessible by the device so the device can selectively retrieve the characteristic, and updating the characteristic at a frequency based on a trigger related to volatility of the RF data being collected.

BRIEF DESCRIPTION OF DISCLOSED EMBODIMENT

DETAILED DESCRIPTION OF DISCLOSED EMBODIMENT

Figure 1:
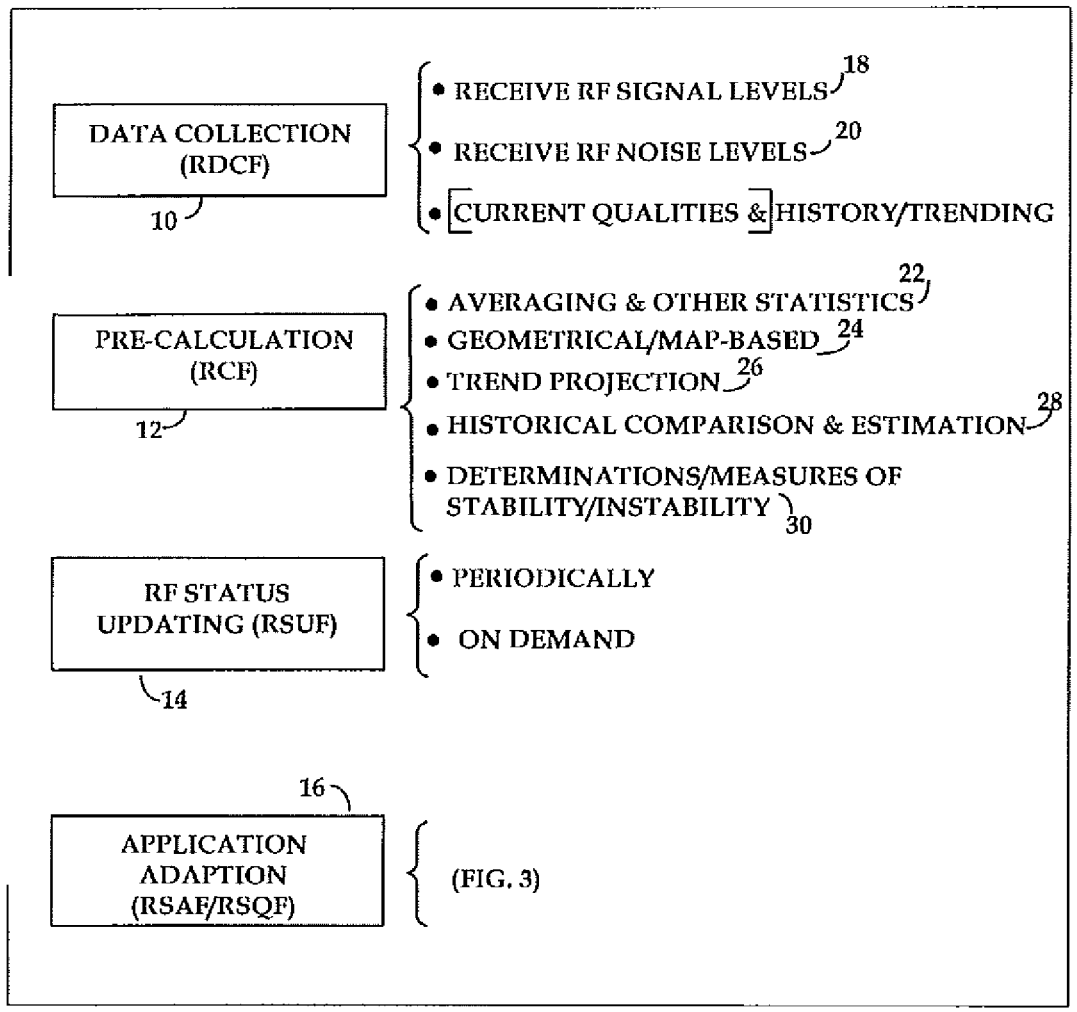
FIG. 1 is a block diagram depicting a method of operating an application according to an exemplary embodiment.

FIG. 1 illustrates elements that enable the adaptation of applications using a wireless network, according to an exemplary embodiment. The first element of the illustrative embodiment is data collection, at 10 in FIG. 1. Data collection comprises measurements of selected variable information relating to operation of a wireless network, or to operation of wireless portions of a network, and is intended to find out what is happening in the wireless network. Although operating parameters of a typical wireless network may change for a variety of reasons, measured data according to the present embodiment generally comprises measuring the signal power of RF signals received at various places in the network, shown in FIG. 1, and measuring RF noise power levels at various places on the wireless network as shown at 20. Measurements of signal power and noise power may be made at one or more base stations in the wireless network, e.g., at cell towers, or at a user's cell phone or other remote terminal using the wireless network at locations relevant to the operation of a particular application on that network. The measured RF signal power and RF noise power permit calculating signal/noise ratios (SNRs), as those skilled in the art can appreciate. Data delay/latency and/or data jitter may also be measured at points within or related to the wireless network, even though they are not specifically wireless network quantities, since they can help measure QoS, and may be used in conjunction with measured signal/noise powers and SNRs, especially for applications/services which are particularly sensitive to delay/latency and/or jitter.

Data collection 10 also includes keeping track of the history of the received signal and noise levels, and may also include keeping track of the history of any other measured quantities such as delay/latency and/or jitter, in order to determine trends, for example, if signal power is increasing or decreasing at a certain rate, at certain locations, at a certain time of day on a certain day of the week, and so on. Such trends relating to time-of-day or day-of-week, if measured for particular users of a wireless network, may be useful for anticipating dynamic variations in the operation of the wireless network based on or correlated to activities of a particular user or group of users.

The amount of data that is collected during the data collection stage 10 may include signal/noise data for each cell tower or cell site in a wireless network, and for many if not most users of the wireless network. Associated delay/latency and/or jitter may also be measured. Furthermore, the data may be collected at relatively short intervals of time, so that the data will reflect signal/noise variations that may occur over milliseconds, seconds, and hours of each day and days of the week (e.g., weekdays vs. weekends). The volume of such data collected for a wireless network will thus become too great for most applications to utilize on anything approaching a real-time usage of the wireless network, and could lead to enormous processing demands that would be overlapping and often replicated between various applications and services. The pre-calculation stage 10 seeks to assimilate large volumes of raw data obtained during the data collection stage, and to obtain one or more measures usable to anticipate or predict near-term future performance of the wireless network. Such a performance measure or metric is then supplied to a particular application using the network, so that the application can adapt to the predicted performance of the wireless network according to the measure or measures thus obtained from the data collection. Different metrics on different time scales may be useful for different types of applications and services, while similar metrics on similar time scales may be useful for similar types of applications and services, such that the pre-calculation may be arranged to provide a set of the most useful metrics on a variety of time scales in order to efficiently and effectively serve the needs of most if not all application services.

One form of pre-calculation involves averaging or other statistical analyses, as indicated at 22 in FIG. 1, of the collected data in an effort to obtain probabilistic measures of wireless-network performance over various time intervals. Such analysis of the collected data may utilize any statistical analysis, e.g., averaging and standard deviations over a predetermined scale that would indicate the relative stability of the signal/noise data or the like. That data analysis may be performed with data taken over various time intervals, so as to support estimation of wireless-network performance during those intervals and also to support predicted performance of the wireless network over some near-term future time during which an application will utilize that network. For example, if the collected data indicates that the wireless network is likely to be relatively unstable at a particular time of day, an application using the network during that time may set its resolution or another operating parameter lower than that application normally would, so as to adapt in a conservative way to the predicted unstable operation of the wireless network supporting use by the application.

Averaging and other statistical analyses, e.g., over various time intervals, may also be applied to other pre-calculated metrics as disclosed herein or as otherwise adopted and used according to embodiments of the disclosed method and apparatus. For a given metric, data analysis may be done using intervals of multiple lengths, since different applications and services may need to use different results reflecting different lengths of time intervals even for the same metric.

Pre-calculation may also include geometrical or map-based functions as indicated at 24 in FIG. 1. Such considerations are, generally speaking, based on locations of wireless devices relative to cell sites within a wireless network. Those relative locations may be expressed in terms of range, for example, within a certain distance from the particular cell site, or based on latitude-longitude coordinates of a particular wireless device. Latitude-longitude coordinates for wireless devices may be obtained, for example, by a GPS capability incorporated in the wireless device, or by other techniques known to those skilled in the art. Furthermore, so-called geographic information systems (GIS) that contain information including map-based and/or map-related information such as on geographic or land-based structures are also known in the art, for example, including buildings or other structures that may have an adverse effect on RF propagation to or from wireless devices in proximity to the structure.

The location of a wireless device, whether map-based or determined within a certain radial/angular relation to a cell site, may correlate with RF signal/noise levels determined during the data collection phase. Those correlations also may exist for instances where the wireless device has predetermined locations or is moving with respect to building or other structures, that may affect signal/noise levels due to characteristics such as attenuation or reflection of RF signals between the wireless device and one or more cell sites. Those correlations with the collected data may also vary during the day, e.g., due to relative density of traffic over the wireless network at certain times of the day and days of the week. Such determinations lead to and enable trend projection as at 26 in FIG. 1, to help provide an application with an idea of what near-term future performance to expect from a wireless network or portion of a wireless network that an application is about to use, not just how the wireless network has performed at a particular time, location of the wireless device, or other factor included in the data collection phase.

Trend projection based on the collected data also enables comparison on multiple related or potentially-interacting trends. For example, wireless traffic for users traveling along a particular location, such as an expressway, may peak at various times of day when traffic jams are likely to occur. However, weekend travelers along the same expressway may be less likely to encounter traffic jams and thus less likely to utilize wireless services at the same time, thereby producing less interference on the available wireless network. Applications using the wireless network can thus benefit from pre-calculated data based on location of the wireless user, and on date/time data, when producing a metric for adjusting operation of an application according to projected capability of the wireless network.

Pre-calculation for historical comparison and estimation, shown at 28 in FIG. 1, is related to trend projection. Historical comparison enables historically-repeatable aspects of a wireless network, as reflected in the data collection, to be captured and utilized. As previously mentioned, time-of-day and weekend vs. weekday are two examples of network performance that may be historically repeatable and utilized to help provide an application with an idea of what quality of service to expect of the wireless network at a particular time.

Determinations of stability or instability, shown at 30 in FIG. 1, may be considered as measures of how dynamic the particular results, summarized or obtained through techniques such as averaging, geometric/map-based correlation, and so on, have been and/or are likely to be in view of the data collected. Such determination and/or prediction may be made in terms of a particular time window or multiple time windows of different lengths or sizes. If the RF signal/noise measurements are relatively volatile, subject to frequent fluctuations without any measurable pattern or trend, the wireless network may be considered relatively unstable, for example leading to any expectation that a given QoS-related metric will likely decrease below a given reasonable threshold with a frequency greater than a threshold frequency acceptable to the application, and an application using that network should be operated accordingly. For example, an application might be set to provide resolution lower than that application normally would provide, so as to adapt in a relatively conservative way to the expected less-reliable or less-consistent service quality of the wireless network, as opposed to expecting the best of the wireless network of just assuming that performance of the wireless network would stay the same over the expected time that the application will utilize that network or that portion of the network.

Reverting to the discussion of the statistical analysis with respect to 22 in FIG. 1, the standard deviation of projected capability for a relatively volatile or unstable wireless network might be categorized differently from the standard deviation expected from a relatively stable wireless network. Those pre-calculated standard deviation values could then be used to adapt the operation of a particular application using that wireless network.

The results of the pre-calculations may be placed on a server or an interface, or otherwise where an application can obtain the pre-calculation information upon request. The RF status information, on which the pre-calculations are based, is preferably updated more or less continuously as indicated at 14 in FIG. 1, and the pre-calculation may likewise be updated based on the ongoing input from the data collection 10. The frequency at which the pre-calculations are updated for availability may be performed and updated at a slightly lower rate of occurrence, but that updated rate could also change based on the volatility of the RF data information being obtained, for instance as volatility increases the update rate could be accordingly increased. Because the goal is being able to provide the applications with meaningful current information upon request, if the RF data being collected is relatively stable, the frequency at which the factors are pre-calculated and updated at 14 may be reduced or performed periodically so as to conserve traffic in the overall system. Different metrics or factors may be pre-calculated and updated at different frequencies.

The data being collected at 10 will likely come from mobile wireless devices such as cell phones and other devices currently communicating with the wireless network. However, information from other sources, such as sensors located at various particular points within the wireless network, may also provide input to the data collection phase. The pre-calculation may take place either at a central processor as described below or dispersed among plural processors, with the results of pre-calculation being made available through at least one central interface or other logical access point where all relevant applications can access for information relevant to the operation or requirements of different applications. For example, some applications may not care about trend projection because those applications cannot usefully or practically extend or adapt operation into the future beyond real-time, some types of video teleconferencing being one such example. Other applications may care very much about trend projection, but not so much about geometrical or map-based pre-calculation functions. Based on the particular service quality requirements for individual applications, those applications can look to a common data source for pre-calculation information most relevant to those requirements. That pre-calculation information in effect tells the application the maximum quality of service available from the wireless network at the time, together with any trend projection or other relevant information based on the pre-calculations. Given that available information about bandwidth capabilities and possible other metrics currently available from the wireless network, various applications may be able to adapt their operations to best conform with that available bandwidth and other metrics and the quality of service supportable by that bandwidth and other metrics.

Figure 2:
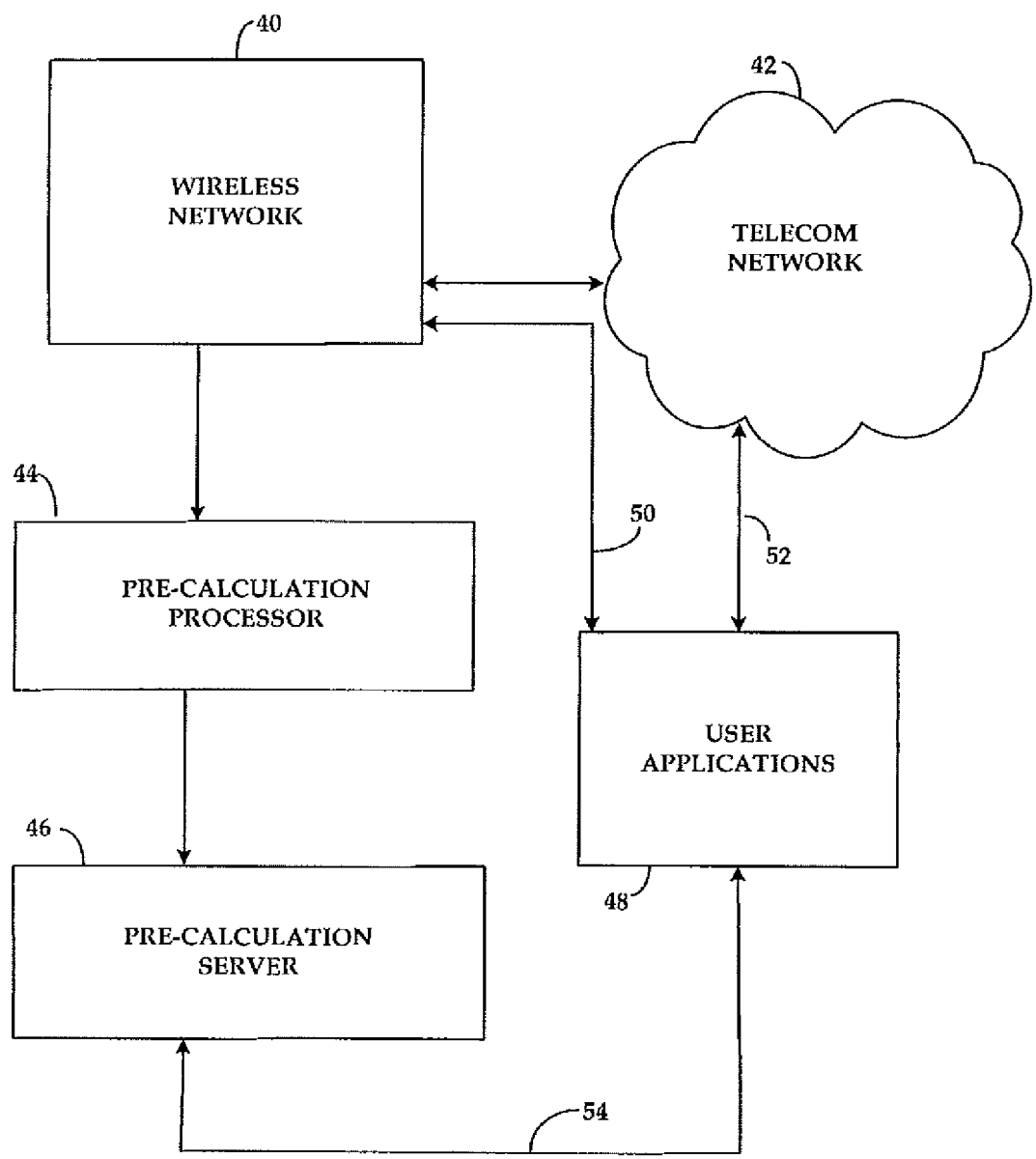
FIG. 2 is a block diagram showing an embodiment of apparatus for adapting an application to quality of service dynamics of a wireless network.

FIG. 2 illustrates, in functional form, an embodiment of apparatus for providing quality of service adaptation to wireless network dynamics. The wireless network indicated generally at 40 will be understood by those skilled in the art to include all the structural and functional elements making up such networks. These elements include cell phones and other wireless devices, as well as cell sites/base stations, controllers, and other hardware and software elements required for operation of a typical wireless network. The wireless network 40 connects to a telecom network shown generally at 42, which may include the conventional public switched telephone network and packet-switched networks and which enables users of the wireless network 40 to communicate with other telecommunications users outside of that wireless network.

The data collection phase 10, discussed above and shown in FIG. 1, takes place within wireless network 40 in the disclosed embodiment, as that wireless network is the primary source of data relating to measureable levels of RF signal and RF noise for wireless communications being handled by the wireless network 40. The data collected by the wireless network 40 is provided to pre-calculation processor 44, for calculating the statistical and other analyses such as described above with respect to the pre-calculation phase 12. The data provided to pre-calculation processor 44 may include geometrical and/or map-based information relating to the particular sources of the collected data, as mentioned above. The metrics resulting from the pre-calculation processor 44, including periodic or triggered updating as indicated at 14 and as discussed above, are supplied to the pre-calculation server 46, where those pre-calculation metrics are made available to any application that uses or is about to use the wireless network 40. For example, user applications 48 may operate over the wireless network 40, either through a direct link 50 with that wireless network or through the telecommunications network 42 as indicated by the link 52. In either case, a particular user application 48, when activated for use on the wireless network 40, may query the pre-calculation server 46 as indicated by the link 54 for the pre-calculated information relating to the quality of service presently available for the particular user on that wireless network. That available quality of service typically is determined by the maximum bandwidth and possible other metrics that the wireless network 40 can support at the time of request by the application, as well as information such as trend projection, relative stability/instability of the wireless network, and other pre-calculated factors based on data being supplied by the wireless network 40. Based on the maximum projected quality of service that the wireless network 40 can currently support for the particular user, the particular user application may adapt its operation as appropriate for that quality of service. For example, some application such as data transmission can tolerate a relatively low transmission rate occasioned by correspondingly-low available quality of service available from the wireless network 40, while other applications such as voice or video may be less tolerant of delays and/or jitter including such as may be occasioned by a momentary or projected reduction in available quality of service. In such instances the user application might inform the user that relatively high-bandwidth service over the particular wireless network is not currently available, or may retry the wireless network after a brief delay, instead of connecting the user to the wireless network without regard for the actual quality of service currently available and/or predicted to be available from that network.

The pre-calculation processor 44 and the pre-calculation server 46, although depicted in FIG. 2 as separate from the wireless network 40, may be provided by the operator of the wireless network as a service made available for applications 48 to access when using that wireless network. In that way, the operator of the wireless network 40 can enable users to adjust their own applications for adapting to wireless network dynamics over which the wireless network 40 has little or no effective control. Moreover, and as mentioned above, the pre-calculation processor 44, using data collected at the wireless network 40, may be located either centrally or may be distributed or shared among plural processors having access to the collected data 10, and the pre-calculation server 46 likewise may be either located centrally or at several locations distributed throughout the wireless network or elsewhere as appropriate.

Figure 3:
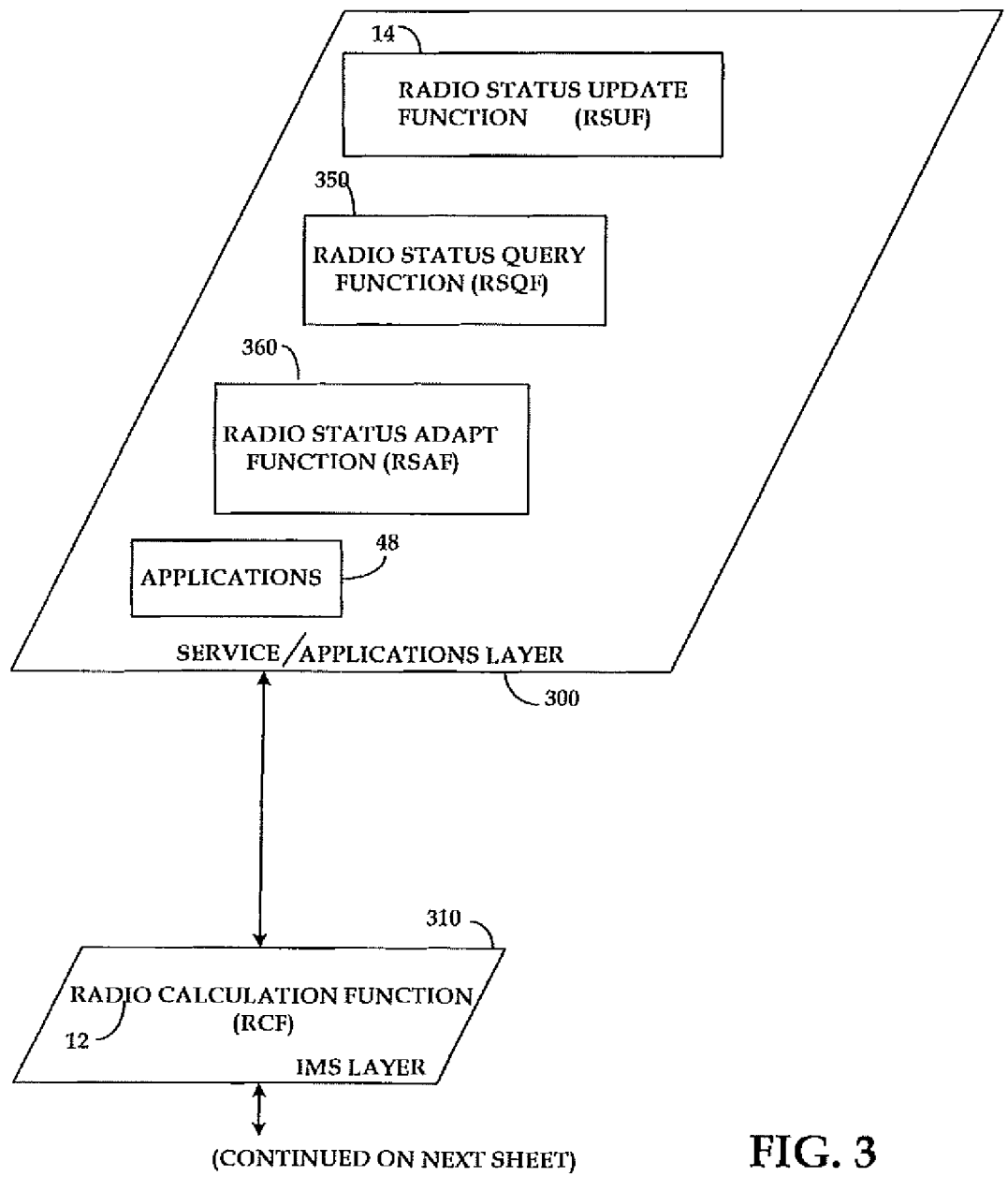
FIGS. 3 and 3A depict an application of the embodiment of FIG. 1 to an IP multimedia subsystem (IMS).
Figure 3A:
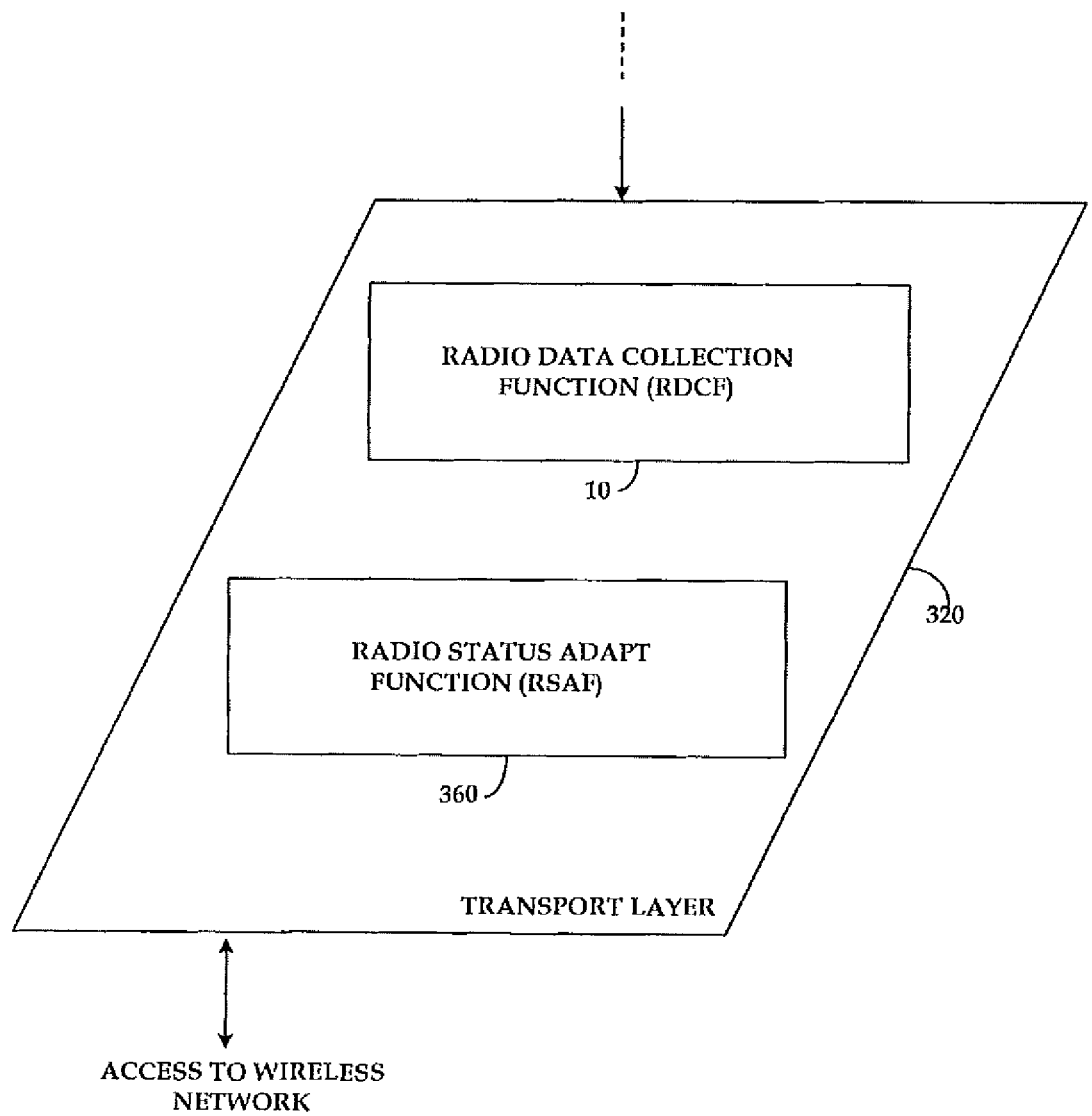

FIGS. 3 and 3A are a functional block diagram showing an example of implementing the disclosed embodiment into an IP Multimedia Subsystem (IMS) for wireless communication. IMS is an architectural framework for delivering internet protocol (IP) multimedia to mobile users. The nature and operation of IMS is well documented and understood by those skilled in the art, and for that reason the individual elements of typical IMS architecture are omitted from FIGS. 3 and 3A. However, those figures do show three basic functional layers of IMS, namely, a service applications layer 300, an IMS layer 310, and a transport layer 320 (FIG. 3A). Generally speaking, the service/applications layer 300 includes a master user database that supports the IMS network entities that actually handle calls over the wireless network. The IMS layer 310 may be considered a kind of middleware layer that handles signaling and service queries to or from the wireless network. The transport layer 320 handles actual access to and from users of the wireless network and interconnections between that network and the greater telecommunications network as illustrated at 42 in FIG. 2. Those skilled in the art will realize that the functions of IMS may be implemented at differing levels in a single network and also may be present multiple times in a single network for load balancing or organizational issues.

FIGS. 3 and 3A are intended to depict an embodiment for implementing, in an exemplary IMS framework, the functions shown and described with regard to FIG. 1. Thus, the radio data collection function (RDCF) 10, which collects the data obtained from the operation of the wireless devices operating within the wireless network, appears within the transport layer 320. That radio data may include GPS or other information collected from the wireless devices, as well as signal/noise levels and other relevant information obtained from cell sites and/or wireless devices. That data is collected and forwarded to the radio calculation function (RCF) 12, shown in FIG. 3 as within the IMS layer 310. Information pre-calculated according to the radio calculation function 12 may be furnished to the radio status update function (RSUF) 14, shown in FIG. 3 as part of the service applications layers 300. The applications 48 themselves, shown logically as part of the service/applications layer 300, would have a radio status query function (RSQF) 350 which operates to query the radio status update function 14. The applications 48 also include an appropriate adaptation function, as previously mentioned and shown in FIG. 3A as the radio status adapt function (RSAF) 360, that enables the application 48 to do an appropriate adaptation controlled by or in response to the radio status update function, e.g., adjusting the mode and/or event delays and/or parameters such as resolution and/or coding and/or transmission rate of data to be communicated over the wireless network, thereby adapting the application to the quality of service presently or prospectively available for that application on the wireless network.

Although IMS is discussed as an architectural framework for the embodiment disclosed with respect to FIGS. 3 and 3A, it should be understood that other middleware and/or enabling systems may be modified and used to support embodiments of the method and apparatus disclosed herein.

Furthermore, it should be understood that the foregoing relates only to disclosed embodiments of the present invention, and that changes and modifications thereto may be made without departing from the spirit and scope of the invention as set forth in the following claims.

The invention claimed is:

1. A method for allowing an application of a wireless communications device to adapt to a dynamic of a wireless telecommunications network, the method comprising:
    determining, by a processor, in response to a trigger associated with a frequency of operation of an element in the wireless telecommunications network, using data comprising radio-frequency information relating to operation of the element of the wireless telecommunications network, a dynamic operational characteristic of the wireless telecommunications network;
    adjusting the application based on the dynamic operational characteristic;
    updating the dynamic operational characteristic at a timing based on a volatility of the radio-frequency information; and
    determining, based on the volatility of the radio-frequency information, a quality of service metric for use in the wireless telecommunications network for the wireless communications device.

2. The method of claim 1, further comprising making the dynamic operational characteristic available to the application of the wireless communications device, wherein making the dynamic operational characteristic available to the application of the wireless communications device comprises storing the dynamic operational characteristic at a server accessible by the wireless communications device so that the wireless communications device can selectively retrieve the dynamic operational characteristic from the server.

3. The method of claim 1, wherein the data further comprises location information associated with the element of the wireless telecommunications network.

4. The method of claim 3, wherein the location information includes at least one piece of information selected from a group consisting of map-based information and geometric information.

5. The method of claim 1, wherein determining the dynamic operational characteristic comprises geometric/map-based correlations.

6. The method of claim 1, wherein the dynamic operational characteristic comprises an anticipated dynamic variation in the wireless telecommunications network.

7. The method of claim 1, wherein determining the dynamic operational characteristic comprises determining the dynamic operational characteristic based on a location of the wireless communications device.

8. The method of claim 1, wherein the dynamic operational characteristic indicates a probabilistic determination of future dynamic operation of the wireless telecommunications network.

9. The method of claim 1, wherein the dynamic operational characteristic indicates a projected trend for use by the application of the wireless communications device in advance of a condition anticipated by the projected trend.

10. The method of claim 1, wherein the dynamic operational characteristic indicates a historical comparison for use by the application of the wireless communications device to adapt operation of the application according to a historically-repeatable quality, of the wireless telecommunications network, indicated by the historical comparison.

11. The method of claim 1, wherein the dynamic operational characteristic indicates a measure indicating stability of the wireless telecommunications network.

12. The method of claim 1, wherein the dynamic operational characteristic indicates multiple modes for use by the application of the wireless communications device to select an appropriate mode of the multiple modes.

13. A non-transitory computer-readable storage device having stored thereon computer-executable instructions that, when executed by a processor, cause the processor to perform operations for allowing an application of a wireless communications device to adapt to a dynamic of a wireless telecommunications network, the operations comprising:
    determining, in response to a trigger associated with a frequency of operation of an element in the wireless telecommunications network, using data comprising radio-frequency information relating to operation of the element of the wireless telecommunications network, a dynamic operational characteristic of the wireless telecommunications network;
    adjusting the application based on the dynamic operational characteristic;
    updating the dynamic operational characteristic at a timing based on a volatility of the radio-frequency information; and
    determining, based on the volatility of the radio-frequency information, a quality of service metric for use in the wireless telecommunications network for the wireless communications device.

14. The non-transitory computer-readable storage device of claim 13, wherein the dynamic operational characteristic comprises an anticipated dynamic variation in the wireless telecommunications network.

15. The non-transitory computer-readable storage device of claim 13, wherein the dynamic operational characteristic comprises a probabilistic determination of future dynamic operation of the wireless telecommunications network.

16. The non-transitory computer-readable storage device of claim 13, wherein the dynamic operational characteristic comprises a projected trend for use by the application of the wireless communications device in advance of a condition anticipated by the projected trend.

17. The non-transitory computer-readable storage device of claim 13, wherein the dynamic operational characteristic comprises a historical comparison for use by the application of the wireless communications device to adapt operation of the application according to a historically-repeatable quality, of the wireless telecommunications network, indicated by the historical comparison.

18. The non-transitory computer-readable storage device of claim 13, wherein the dynamic operational characteristic comprises a measure indicating stability of the wireless telecommunications network.

19. The non-transitory computer-readable storage device of claim 13, wherein determining the dynamic operational characteristic is based on a location of the wireless communications device.

20. A system for allowing an application of a wireless communications device to adapt to a dynamic of a wireless telecommunications network, the system comprising:
    a processor; and
    a computer-readable storage device that stores computer-executable instructions that, when executed by the processor, cause the processor to perform operations comprising:
        determining, in response to a trigger associated with a frequency of operation of an element in the wireless telecommunications network, using data comprising radio-frequency information relating to operation of the element of the wireless telecommunications network, a dynamic operational characteristic of the wireless telecommunications network;

adjusting the application based on the dynamic operational characteristic;

updating the dynamic operational characteristic at a timing based on a volatility of the radio-frequency information; and determining, based on the volatility of the radio-frequency information, a quality of service metric for use in the wireless telecommunications network for the wireless communications device.

* * * * *